Nov. 1, 1938.  G. W. GRISDALE  2,134,873
CHART MOUNTING FOR RECORDING INSTRUMENTS
Filed March 17, 1937  3 Sheets-Sheet 1
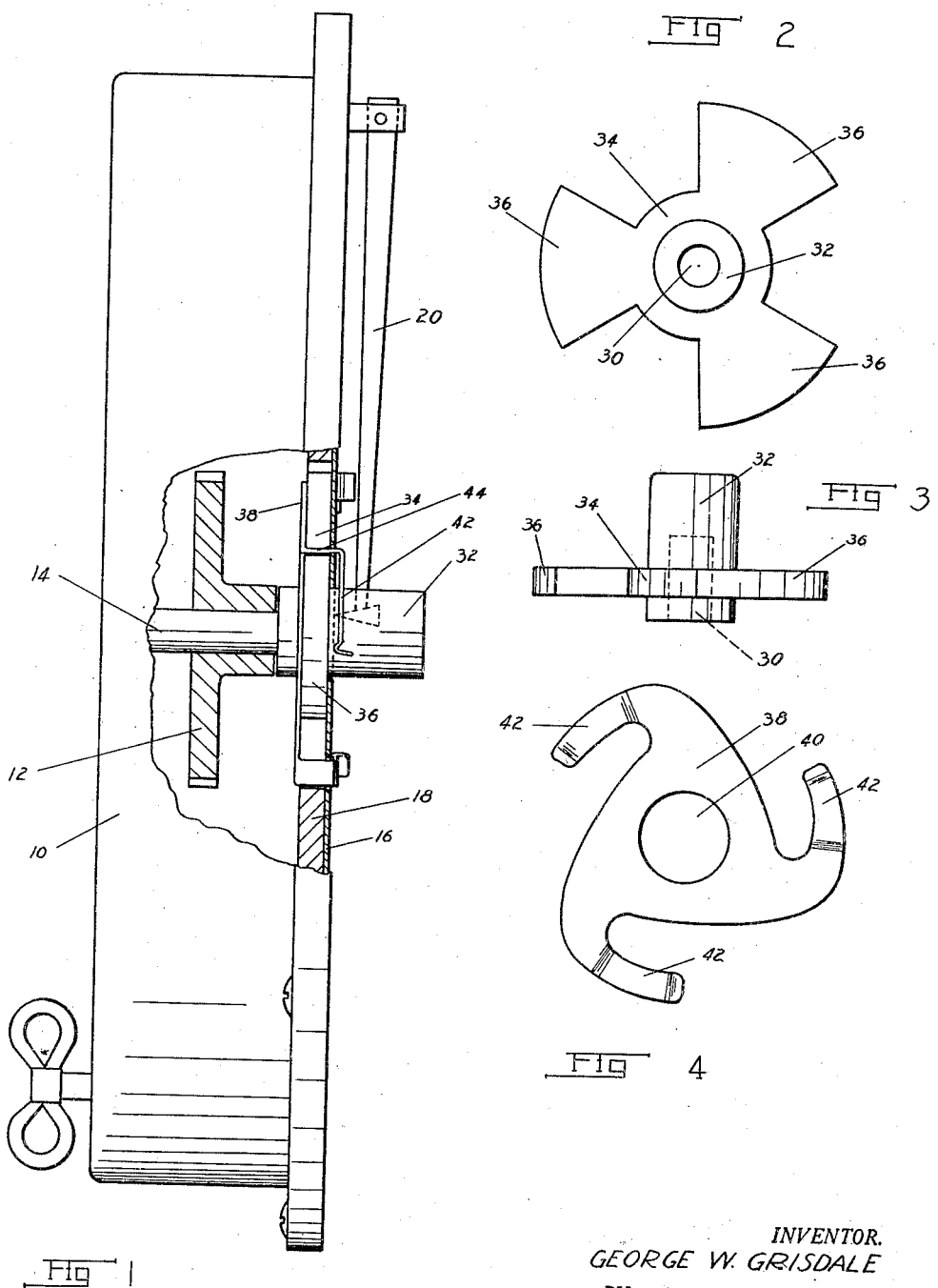
INVENTOR.
GEORGE W. GRISDALE
BY McConkey & Booth
ATTORNEYS.

Nov. 1, 1938. G. W. GRISDALE 2,134,873
CHART MOUNTING FOR RECORDING INSTRUMENTS
Filed March 17, 1937 3 Sheets-Sheet 2
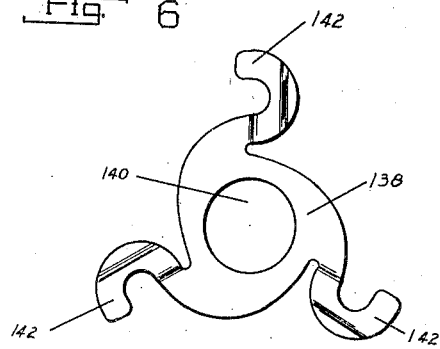
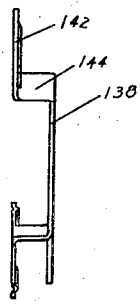
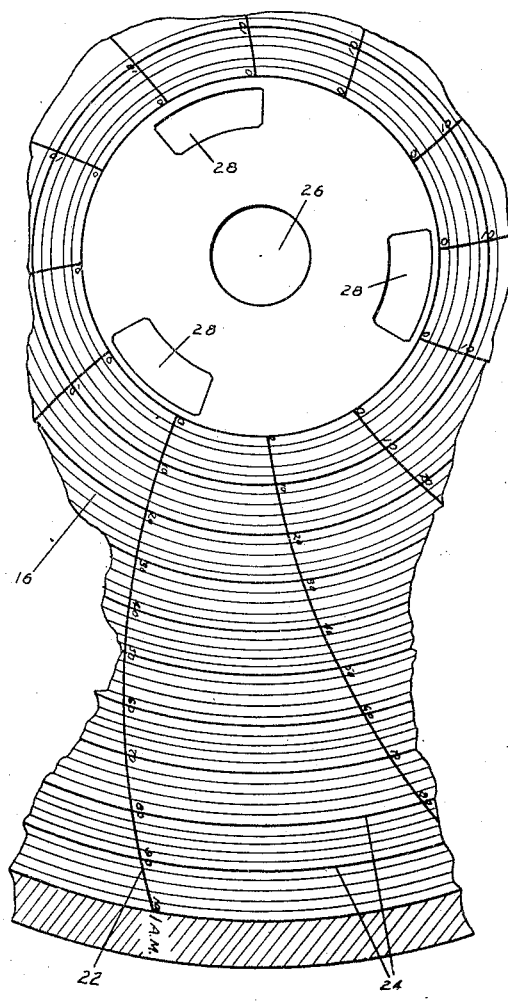
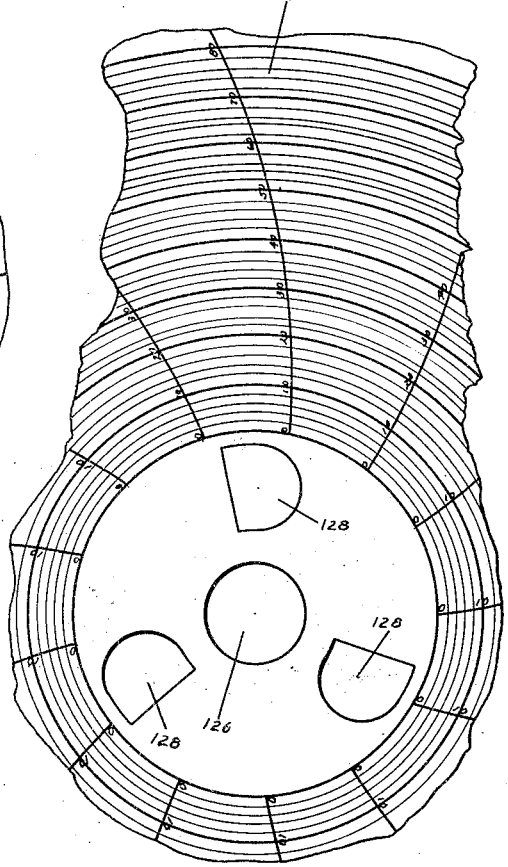
INVENTOR.
GEORGE W. GRISDALE
BY McConkey & Booth
ATTORNEYS.

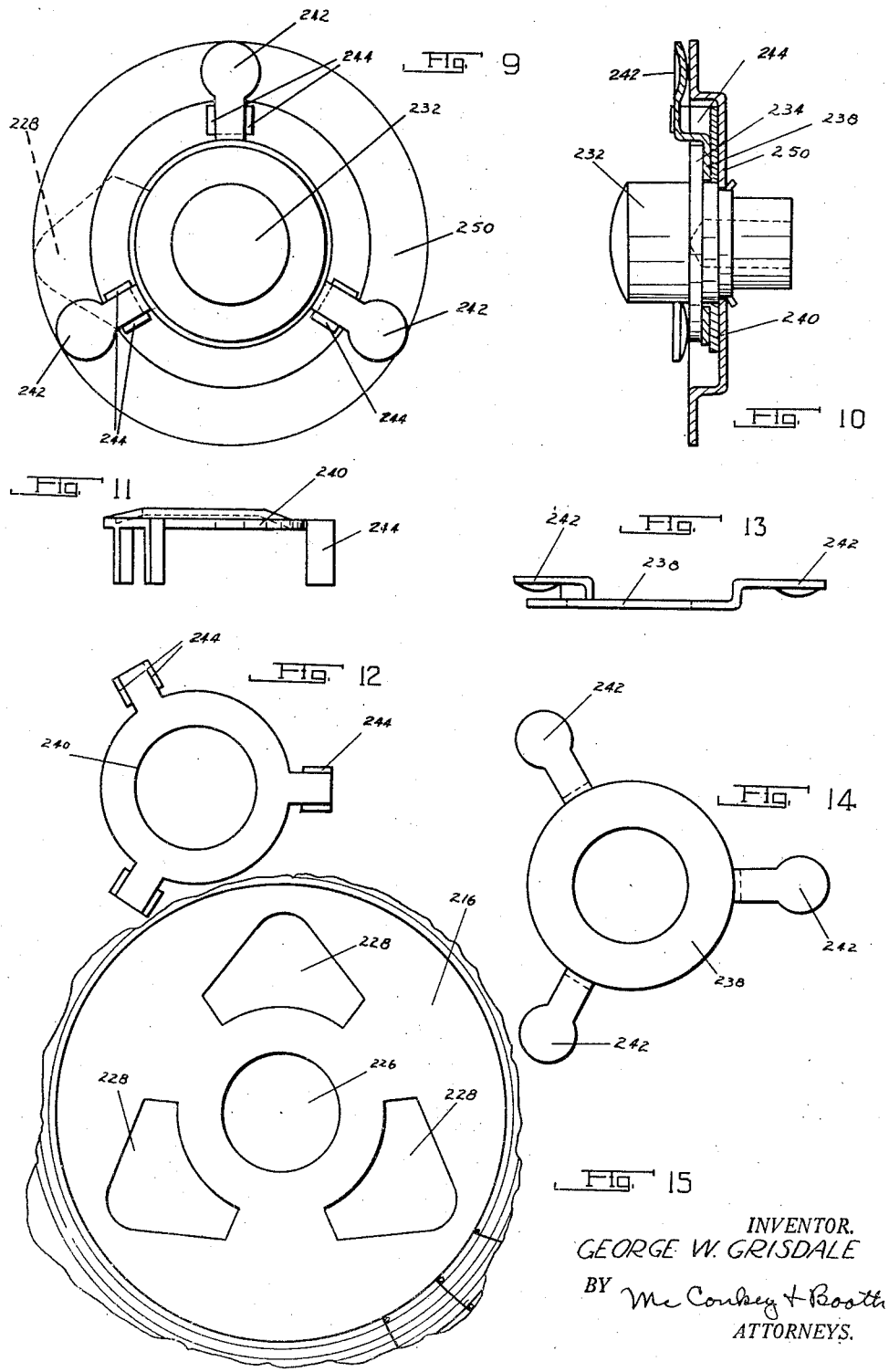

Patented Nov. 1, 1938

2,134,873

UNITED STATES PATENT OFFICE 2,134,873

CHART MOUNTING FOR RECORDING INSTRUMENTS

George W. Grisdale, Chicago, Ill., assignor to Republic Flow Meters Company, Chicago, Ill., a corporation of Illinois Application March 17, 1937, Serial No. 131,308

5 Claims. (Cl. 234—75)

This invention relates to recording instruments, and is illustrated as embodied in recording instruments having novel means for yieldingly clamping in place the charts used therein.

An object of the invention is to simplify the insertion of the charts in instruments of this character, by providing chart-clamping means rendered effective by merely placing the chart on the usual chart post and then turning it. Preferably this also brings portions of the chart against parts extending across the plane of the chart, to time the chart.

The clamping means illustrated includes a device having a part seated on the chart post, and which may bear against the back of a chart-supporting flange, and spring fingers bearing against the face of the flange and beneath which the chart is turned. The fingers are arranged to cross the plane of the chart, to serve as the timing means.

The above and other objects and features of the invention, including various novel arrangements and desirable constructions of parts, will be apparent from the following description of the illustrative embodiments shown in the accompanying drawings, in which:

Figure 1 is a side elevation of an instrument embodying one form of the invention, partly broken away in central section;

Figure 2 is a bottom view, looking from left to right in Figure 1, or upwardly in Figure 3, of the chart post;

Figure 3 is another view of the chart post, looking downwardly at Figure 2;

Figure 4 is a plan view of a novel yielding clamp device to be mounted on the chart post;

Figure 5 is a view showing part of a chart adapted to be used in the instrument of Figure 1;

Figure 6 is a view corresponding to Figure 4 but showing a different form of clamp device;

Figure 7 is a side elevation of the clamp device of Figure 6;

Figure 8 is a view of part of a chart design for use with the device of Figures 6 and 7;

Figure 9 is a view corresponding to Figure 4 and to Figure 6, but showing a third form of clamp device which comprises an assembly of three stampings;

Figure 10 is a section centrally therethrough;

Figures 11 and 12 are side elevation and plan views of one of the stampings;

Figures 13 and 14 are side elevation and plan views of another of the stampings; and Figure 15 is a view of part of chart for use with the clamp device of Figures 9–13.

Figure 1 illustrates an instrument 10 of any desired recording type, having a clock mechanism terminating in a final gear 12 driving a shaft 14 operating a chart post described below, to turn a novel disk-like paper printed chart 16 backed by a panel 18 under a recording pen 20.

The novel chart 16 as shown in Figure 5, has the usual time graduations 22, and a series of concentric circles 24 which form the graduations indicating the value of the quantities which control the pen 20. The chart has a central circular opening 26 adapted to seat over a central chart post driven by the shaft 14, and one or more (e. g. three) other openings 28 adapted to fit over spring clamp fingers as described below. Each opening 28 is bounded by two radial lines and two circular arcs concentric with the opening 26.

The end of shaft 14 is a frictional fit in an axial recess 30 in a novel chart post 32 of circular outline, and over which the opening 26 fits. This chart post has preferably formed integrally therewith, a flange 34 with three sector-shaped spaced lugs 36 all arranged to back up the chart 16, and with their outer surface in the plane of the chart-engaging surface of the panel.

The spaces between the lugs 36 allow for the assembly on the chart post 32 of the spring clamp device 38 shown in Figures 1 and 4. The particular form of clamp device shown includes a spring washer, having a central opening 40 fitting over the chart post 32 below the flange 34, with the body of the washer engaging the lower face of the flange, and tangential spring fingers 42 connected to the body of the washer by portions 44 at right angles thereto.

When the clamp device 38 is assembled on the chart post 32, before the chart post is mounted on the shaft 14, the spring fingers 42 are passed through the openings between the lugs 36, and the device is then turned to bring these fingers above and bearing against the lugs. The device 38 is then fastened to the flange 34, by a pin or setscrew or by soldering or in any other desired manner, so that it cannot turn relatively thereto.

When the chart 16 is placed in the instrument the opening 26 fits over the chart post 32, and the openings 28 register with the spring fingers 42. The ends of fingers 42 are turned up, so that they form bevels or wedges at the ends of the fingers, whereby the chart may be turned angularly about the post 32, to turn or wedge the chart under the fingers 42. The radial ends of the openings 28 form timing surfaces which engage the portions 44 of the clamp device 38, which extend across the plane of the chart as shown in Figure 1. This predetermines the angular position of the chart in the instrument, and insures correct timing.

The chart post may, as above noted, be frictionally mounted on the shaft 14, or the gear 12 may be frictionally connected to the shaft, so that if the timing is wrong (i. e. if the clock runs fast or slow, or is being reset after running down) the chart may be correctly set manually by turning the chart post 32 relatively to the clock mechanism.

In the modification illustrated in Figures 6, 7 and 8, parts corresponding to parts in Figures 1–5 are designated by the same reference characters increased by 100. The principal differences are that the spring fingers 142 are generally radially-extending parts of semicircular shape bent up at their rounded edges so that the chart can be turned under them, and that the openings 128 are shaped to correspond. It will be noted, however, that the timing edge of each opening 128 is still substantially radial.

In Figures 9–15 the chart post 232, formed with a flange 234, has seated thereon below the flange three stampings, viz a clamp device 238 shown in Figures 13 and 14, a timing device 240 shown in Figures 11 and 12, and finally a cup-shaped stamping 250 having an outer flange in the plane of flange 234 and panel 18. The stamping or support 250 is staked or secured in any other desired manner to the chart post 232. The stamping 240 is bowed slightly, as shown in Figure 11, so that when the parts are assembled it is compressed between stampings 238 and 250, and holds them frictionally against turning unless it is necessary to reset the device.

The stamping 238 has radial spring fingers 242, rounded on their bottoms to facilitate sliding the chart under them, and which bear against the stamping 250. The stamping 240 has pairs of lugs 244, each pair embracing one of the spring fingers 242 between them, and which form the parts engaged by timing edges of the openings 228 of the chart 216.

Each of the openings 228 has its inner edge on an arc concentric with the central opening 226, and at the ends of which are substantially radial timing edges engageable with lugs 244, outwardly of which are converging edges leaving at the center line of the opening sufficient space radially of the chart to pass over one of the spring fingers 242.

Figure 9 shows one opening 228 in dotted lines after the chart has been turned under the spring clamp fingers 242.

It will be noted that the entire chart-holding assembly 238—244 is frictionally mounted on the chart post, and can be turned angularly thereon, to reset the chart if the timing is wrong.

While three illustrative embodiments have been described in detail, it is not my intention to limit the scope of the invention to those particular embodiments, or otherwise than by the terms of the appended claims.

I claim:

1. A recording instrument comprising, in combination with a chart having a circular central opening and with another opening offset from said central opening, a driven chart post of circular outline seated in said central opening and about which said chart is adapted to be turned angularly, a support behind the central portion of the chart and which is driven with said chart post, and a spring finger bearing against the support and over which said other opening can be placed and the chart turned to bring the chart body between said finger and the support, said finger having a stop portion crossing the plane of the chart and against which the edge of said other opening seats when the chart is so turned, to time the chart.

2. A recording instrument comprising a chart post of circular outline having a support flange extending radially outward therefrom to back up a chart centered on said post, a device having a part seated against the bottom having other parts yieldingly tensioned against the top of said flange and beneath which portions of said chart may be brought to be yieldingly clamped to said flange thereby.

3. A recording instrument comprising a chart post of circular outline having a supporting flange extending radially outward therefrom to back up a chart centered on said post, and a spring washer seated on said post behind said flange and formed with fingers yieldingly tensioned against the face of said flange.

4. A recording instrument comprising a chart post of circular outline upon which a chart is adapted to be centered and about which said chart may be turned, a support adjacent said post and backing up a chart centered on the post, and spring fingers associated with said support and having curved portions bearing against the support and having adjacent upturned portions beneath which portions of the chart may be slid by turning the chart about the post, said fingers also having portions crossing the plane of the chart and against which parts of the chart are turned to time the chart.

5. A recording instrument chart post having chart-holding means frictionally mounted thereon and angularly adjustable relatively thereto to correct the timing of a chart held thereby, said chart holding means including a part to clamp a chart on the post and a part to restrict turning of the chart on the post.

GEORGE W. GRISDALE.